(12) United States Patent
Tseng

(10) Patent No.: US 8,998,431 B2
(45) Date of Patent: Apr. 7, 2015

(54) VEHICULAR EXTERIOR REARVIEW MIRROR ASSEMBLY

(71) Applicant: Wen-Pin Tseng, Changhua County (TW)

(72) Inventor: Wen-Pin Tseng, Changhua County (TW)

( * ) Notice: Subject to any disclaimer, the term of this patent is extended or adjusted under 35 U.S.C. 154(b) by 248 days.

(21) Appl. No.: 13/685,738

(22) Filed: Nov. 27, 2012

(65) Prior Publication Data
US 2014/0146407 A1    May 29, 2014

(51) Int. Cl.
*G02B 7/182* (2006.01)
*B60R 1/076* (2006.01)

(52) U.S. Cl.
CPC ............... *G02B 7/182* (2013.01); *B60R 1/076* (2013.01)

(58) Field of Classification Search
CPC .......... B60R 1/07; B60R 1/072; B60R 1/074; B60R 1/06; B60R 1/068
USPC .......................... 359/872, 873, 874, 877, 841
See application file for complete search history.

(56) References Cited

U.S. PATENT DOCUMENTS

| | | | |
|---|---|---|---|
| 7,104,660 B2* | 9/2006 | Sakata et al. | 359/841 |
| 7,267,449 B1* | 9/2007 | Boddy et al. | 359/877 |
| 7,427,142 B2* | 9/2008 | Onuki | 359/841 |

* cited by examiner

*Primary Examiner* — Euncha Cherry
(74) *Attorney, Agent, or Firm* — Bacon & Thomas, PLLC

(57) ABSTRACT

An exterior rearview mirror assembly is to be mounted to a vehicle and includes a pedestal, a mirror holder, a coupling member connected between the pedestal and the mirror holder, a sleeve mounted to the coupling member, an engagement member held between the coupling member and the pedestal, a first screwed fastener threaded with the pedestal, a limiting member mounted to the first screwed fastener, and a springy member held between the limiting member and the coupling member. The engagement member is engaged with the pedestal and the sleeve. When the engagement member is controlled to disengage selectively from the pedestal or the sleeve, an included angle between the coupling member and the pedestal can be adjusted.

5 Claims, 6 Drawing Sheets

VEHICULAR EXTERIOR REARVIEW MIRROR ASSEMBLY

BACKGROUND OF THE INVENTION

1. Field of the Invention

The present invention relates generally to a rearview mirror and more particularly, to a vehicular exterior rearview mirror assembly for automobile.

2. Description of the Related Art

Generally speaking, a car includes two exterior rearview mirror assemblies mounted to two respective front lateral sides thereof and having one or multiple mirrors for reduction of deficiency (blind zone) of the driver's view angle. The rearview mirror assemblies are also collapsible to allow the driver to manually or electrically collapse them for lower possibility of damage thereto when the car stops.

To further meet operational needs of different drivers, it would be better for the rearview mirror assemblies to have the function of angle adjustment. However, the rearview mirror assemblies of some kinds of large vehicles are too heavy and enormous to be quickly collapsed, adjusted for angle, and structurally strong, so further improvement is required.

SUMMARY OF THE INVENTION

The primary objective of the present invention is to provide a vehicular exterior rearview mirror assembly, which can be quickly collapsed, adjusted for angle, and structurally strong.

The foregoing objective of the present invention is attained by the exterior rearview mirror assembly composed of a pedestal, a mirror holder, a coupling member, a sleeve, an engagement member, at least one screwed fastener, a limiting member, and a springy member. The pedestal is mounted to a vehicle and includes an axial joint part. The axial joint part includes a plurality of first convex portions facing a first direction and a plurality of first concave portions facing the first direction. The first convex and concave portions are arranged alternately around an axis annularly. A plurality of inclined guide surfaces each are located between every adjacent said first convex and concave portions. The mirror holder includes at least one mirror. The coupling member includes two ends, one of which is connected with the mirror holder and the other is a pivotal portion rotatably mounted to the pedestal around the axis, The pivotal portion includes an axial hole extending axially and a spacer located inside the axial hole. The spacer includes a central hole and a plurality of perforations. The sleeve is movably mounted inside the axial hole for movement between an engagement position and a disengagement position and includes a plurality of first teeth arranged annularly on a top end thereof around the axis and facing a second direction contrary to the first direction. The first teeth are mounted to the perforations, respectively. The engagement member is mounted between the spacer and axial joint part and includes a plurality of second convex portions facing the second direction, a plurality of second concave portions facing the second direction, a plurality of inclined guide surfaces each are located between every adjacent second convex and concave portions, and a plurality of second teeth arranged annularly around the axis and facing the first direction. The second convex and concave portions are arranged alternately around the axis annularly and corresponsively engaged with the first convex and concave portions. The first screwed fastener includes a head end and a threaded end and is inserted through a central hole of the spacer and threadably connected with the axial joint part via the threaded end. The limiting member is mounted to the first screwed fastener. The springy member is held between the limiting member and the pivotal portion for providing the spacer with elastic prestress facing the second direction.

When the sleeve is located at the engagement position, the first teeth engages the second teeth. When the sleeve is located at the disengagement position, the first and second teeth disengage from each other. When the user forces the mirror holder or the coupling member to move, the first and second convex portions can move away from the corresponsive firs and second concave portions and the first and second convex portions can be engaged with the other first and second concave portions. In this way, an included angle between the mirror holder and coupling member and the pedestal can be flat-tuned quickly. Besides, when the sleeve moves to the disengagement position from the engagement position, the first and second teeth disengage from each other and meanwhile, the mirror holder and coupling member can pivot relatively to the pedestal and the included angle therebetween can be flat-tuned.

DETAILED DESCRIPTION OF PREFERRED EMBODIMENTS

Structural features and desired effects of a vehicular exterior rearview mirror assembly of the present invention will become more fully understood by reference to a preferred embodiment given hereunder. However, it is to be understood that these embodiments are given by way of illustration only, thus are not limitative of the claim scope of the present invention.

Figure 1:
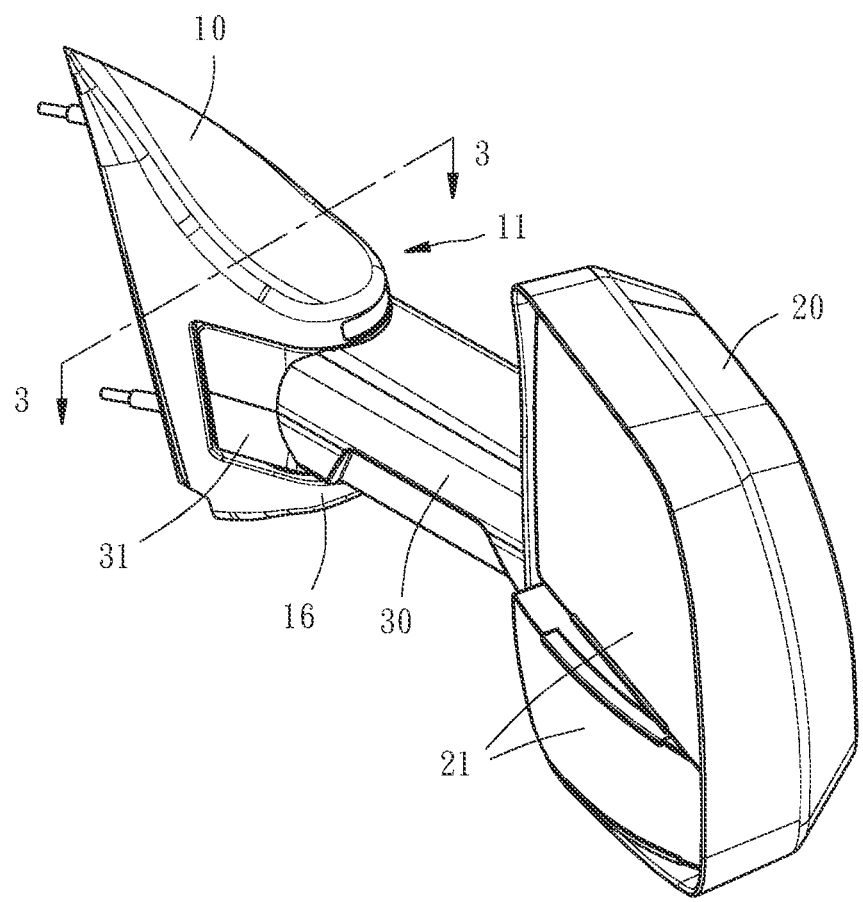
FIG. 1 is a perspective view of a preferred embodiment of the present invention.
Figure 2:
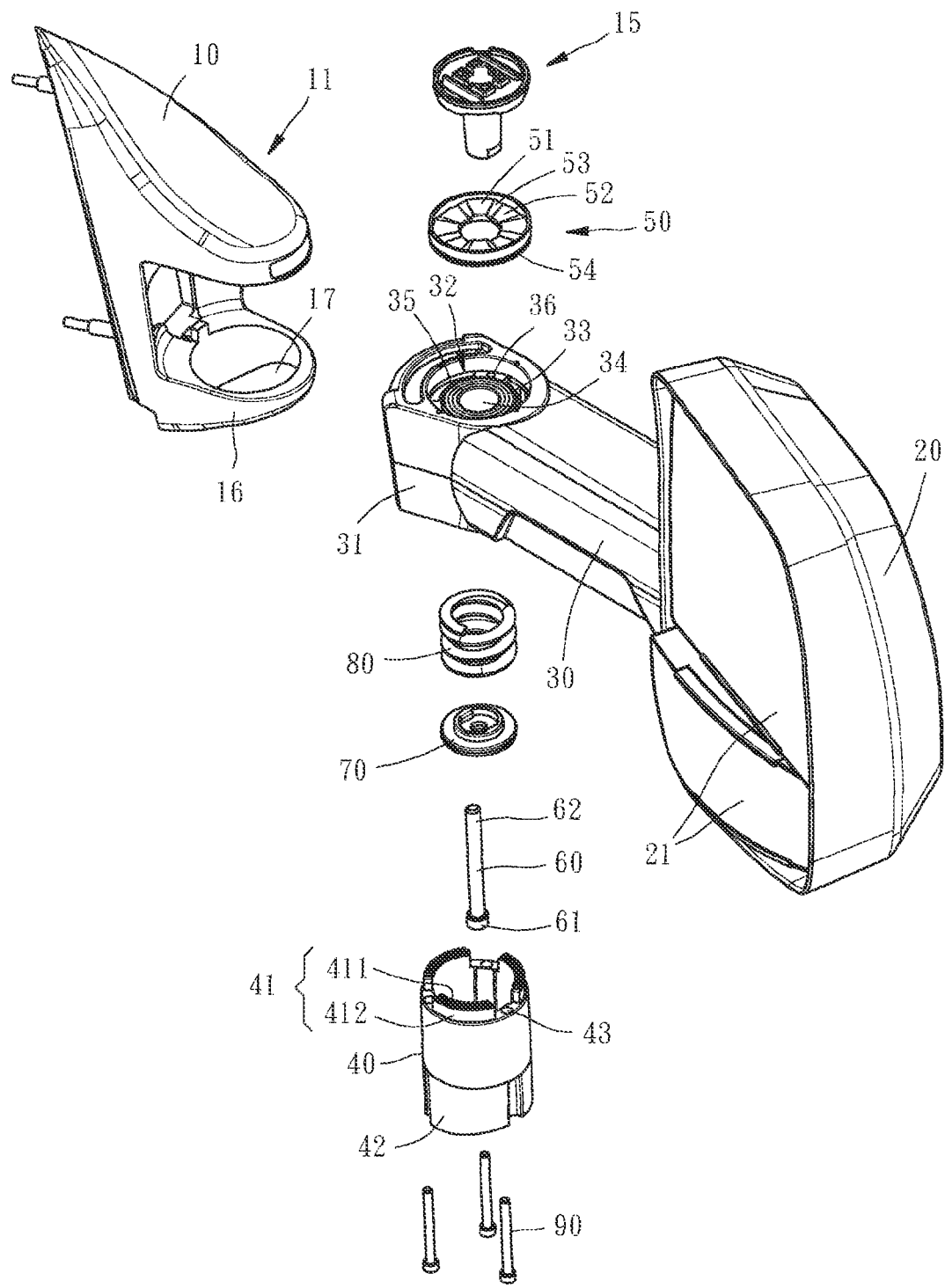
FIG. 2 is an exploded view of the preferred embodiment of the present invention.
Figure 3:
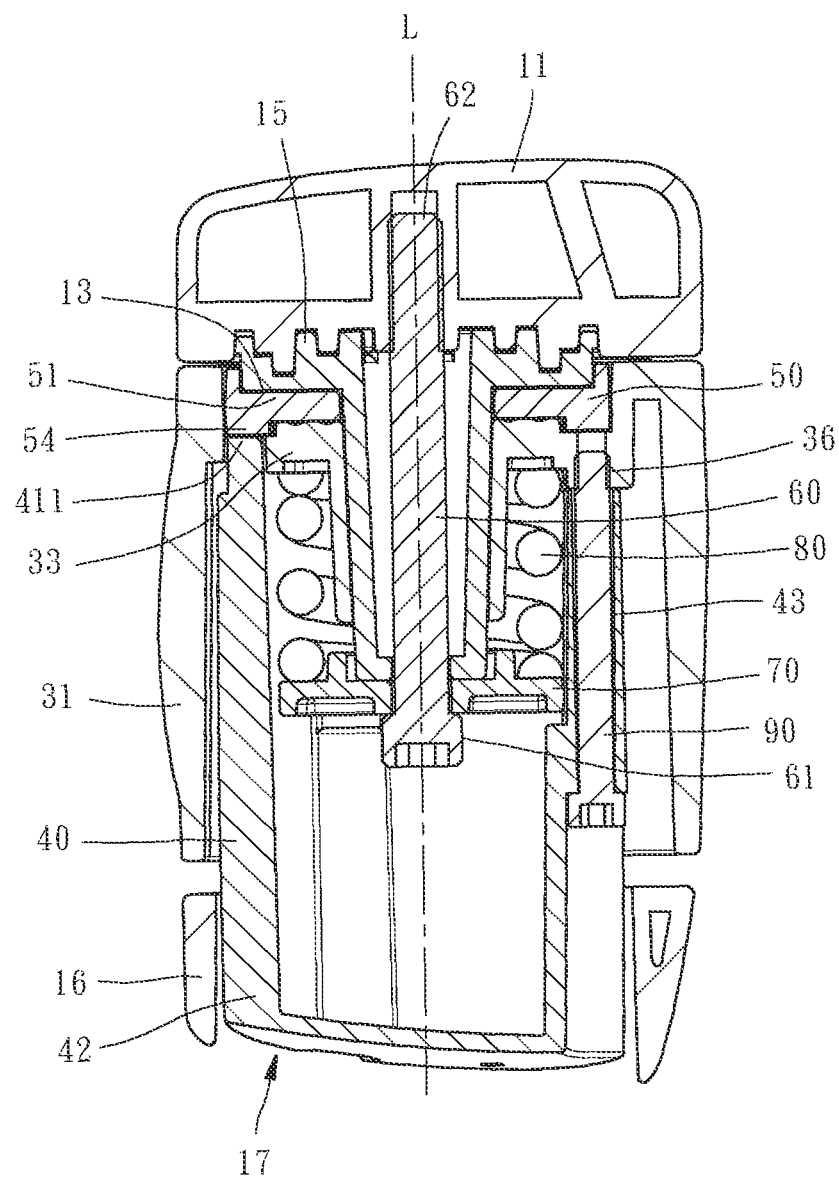
FIG. 3 is a sectional view taken along a line 3-3 indicated in FIG 1.

Referring to FIGS. 1-3, a vehicular exterior rearview mirror assembly constructed according to a preferred embodiment of the present invention is composed of a pedestal 10, a mirror holder 20, a coupling member 30 connected between the pedestal 10 and the mirror holder 20, a sleeve 40, an engagement member 50, a first screwed fastener 60, a limiting member 70, a springy member 80, and a plurality of second screwed fasteners 90. The detailed descriptions and operations of these elements as well as their interrelations are recited in the respective paragraphs as follows.

Figure 4:
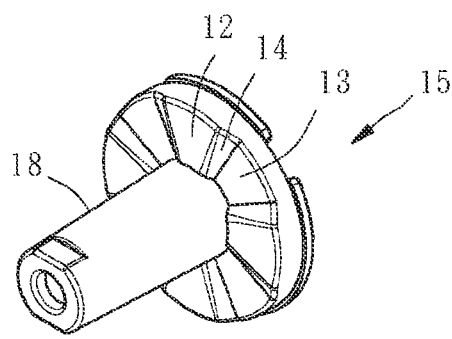
FIG. 4 is a perspective view of the engagement member in accordance with the preferred embodiment of the present invention.

The pedestal 10 is mounted to one of two front lateral sides thereof and includes an axial joint part 11 and a protrusive ring part 16. As shown in FIG. 4, the axial joint part 11 includes a plurality of first convex portions 12 facing downwardly, a plurality of first concave portions 13 facing downwardly, and a plurality of inclined guide surfaces 14 each located between every adjacent first convex and concave portions 12 and 13. The first convex and concave portions 12 and 13 are arranged alternately around an axis L annularly. The protrusive ring part 16 includes a pivotal hole 17 corresponding to the axis L, namely, the pivotal hole 17 running through the protrusive ring part 16 axially.

In this embodiment, the axial joint part 11 includes an axial coupler 15 detachably mounted to other parts thereof. The first convex portions 12, the first concave portions 13, and the inclined guide surfaces 14 are formed on the axial coupler 15. The axial coupler 15 has a hollow rotary shaft 18 protruding along the axis L. The axial coupler 15 is detachable to enable the molding process of the first convex portions 12, the first concave portions 13, and the inclined guide surfaces 14 to be simplified. Alternatively, the axial coupler 15 can be not detachable in the present invention.

The mirror holder 20 includes at least one mirror 21 as per actual requirement and there are two said mirrors 21 in this embodiment.

The coupling member 30 includes two ends, one of which is connected with the mirror holder 20 and the other is a pivotal portion 31 through which the rotary shaft 18 is inserted in such a way that the coupling member 30 is rotatably mounted to the pedestal 10 on the axis L. The pivotal portion 31 includes an axial hole 32 extending upwardly axially and a spacer 33 located inside the axial hole 32. The spacer 33 includes a central hole 34 and a plurality of perforations 35.

The sleeve 40 is movably mounted inside the axial hole 32 for movement between an engagement position and a disengagement position and includes a top end 41 and a bottom end 42. A plurality of first teeth 411 are arranged annularly on the top end 41 around the axis L. The first teeth 411 are fixedly inserted through the perforations 35. Specifically, the top end 41 of the sleeve 40 has a plurality of convexities 412, the first teeth 411 are formed on top sides of the convexities 412, and the convexities 412 are engaged into the respective perforations 35 in such a way that the sleeve 40 fails to be rotated relatively to the pivotal portion 31. Besides, the bottom end 42 of the sleeve 40 is rotatably mounted inside the pivotal hole 17 and axially movable inside the pivotal hole 17.

The engagement member 50 is sleeved onto the rotary shaft 18 and located between the spacer 33 and the axial joint part 11 and includes a plurality of second convex portions 51 facing upwardly, a plurality of second concave portions 52 facing upwardly, and a plurality of inclined guide surfaces 53 between every adjacent second convex and concave portions 51 and 52. The second convex and concave portions 51 and 52 are arranged alternately around the axis L annularly and engaged with the first convex and concave portions 12 and 13. Besides, the engagement member 50 further includes a plurality of second teeth 54 arranged annularly around the axis L and facing a first direction.

The first screwed fastener 60 includes a head end 61 and a threaded end 62 and is inserted through the central hole 34 of the spacer 33 to make the threaded end 62 pass through the rotary shaft 18 to be threaded with the axial joint part 11.

The limiting member 70 is mounted to the first screwed fastener 60 and preferably close to the head end 61.

The springy member 80 is held between the limiting member 70 and the pivotal portion 31 (specifically the spacer 33 as an example) for providing the spacer 33 with elastic prestress facing upward to enable the engagement member 50 to be held between the axial joint part 11 and the spacer 33 in the process of general operation of the engagement member 50.

For mounting the second screwed fasteners 90, the pivotal portion 3 includes a plurality of threaded holes 36 corresponding to the second screwed fasteners 90 and the sleeve 40 includes a plurality of through holes 43 corresponding to the second screwed fasteners 90 in such a way that the two screwed fasteners 90 can pass through the through holes 43 to be threaded into the threaded holes 36. In this way, when the depth for which the two screwed fasteners 90 are threaded into the threaded holes 36 is adjusted, the axial position of the sleeve 40 relatively to the pivotal portion 31 can be adjusted.

Figure 5:
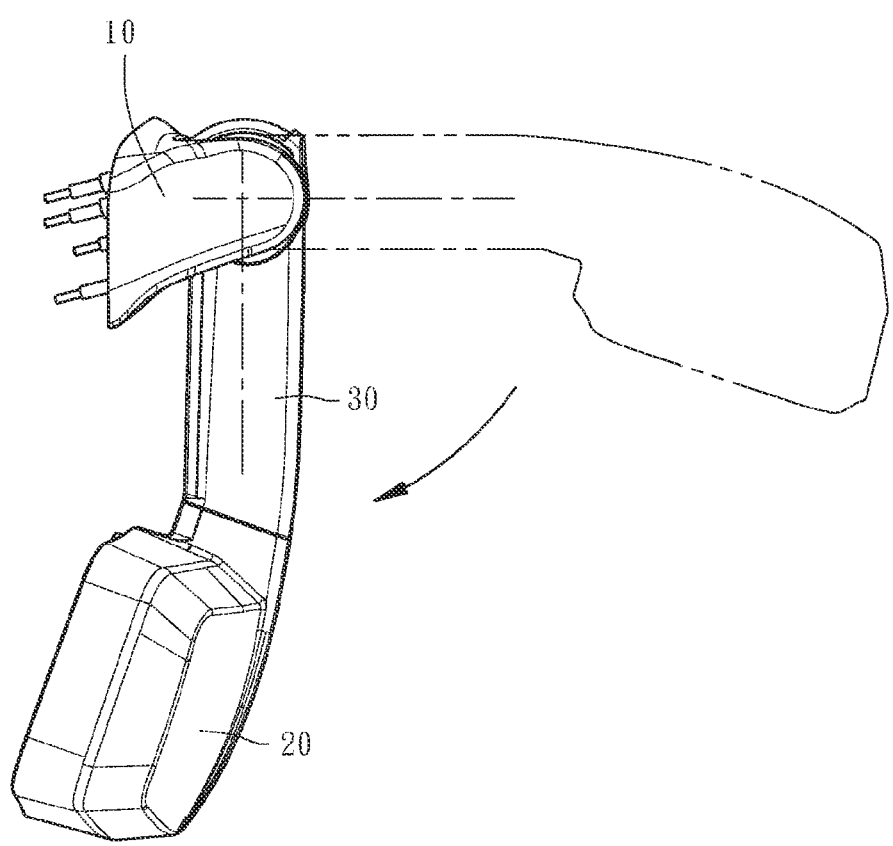
FIG. 5 is a schematic view of the preferred embodiment of the present invention at work.
Figure 6:
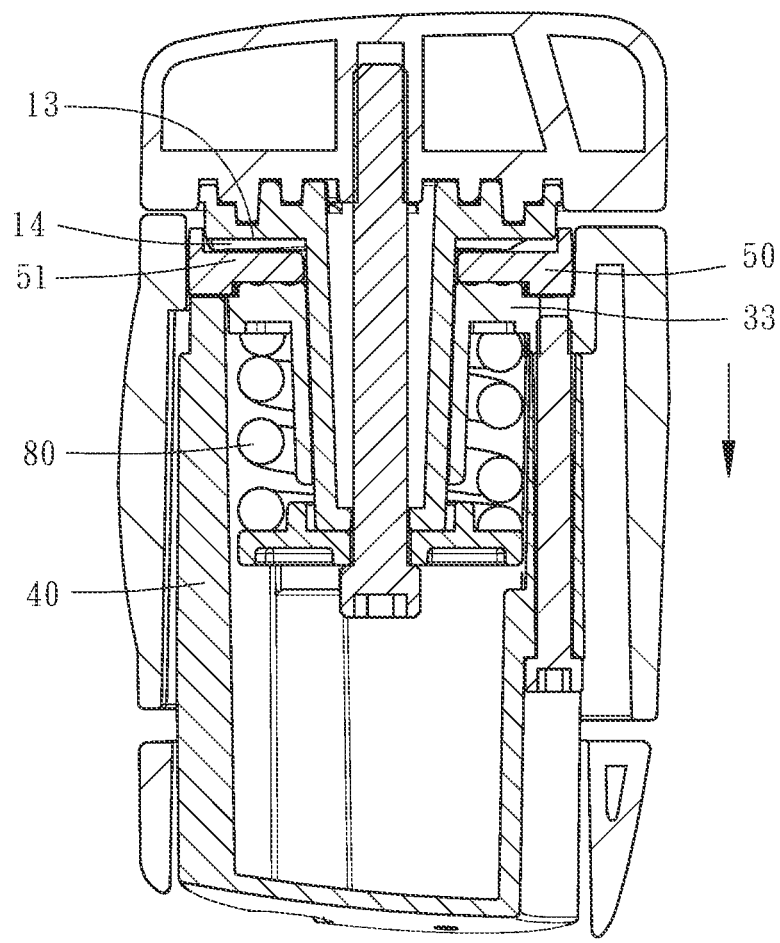
FIG. 6 is a sectional view of the preferred embodiment of the present invention at work.

Referring to FIG. 5, when it is intended to quickly collapse an included angle between the coupling member 30 and the pedestal 10, the user can turn the coupling member 30 or the mirror holder 20 and meanwhile, the inclined guide surface 53 of the engagement member 50 can slide relatively to the inclined guide surface 14 of the axial joint part 11 to enable the engagement member 50, the spacer 33, and the sleeve 40 to move downwardly and compress the springy member 80, as shown in FIG. 6. After that, the first and second convex portions 12 and 51 disengage from the first and second concave portions 13 and 52, respectively, and when the first and second convex portions 12 and 51 reaches and fits another first and second concave portions 13 and 52, the springy member 80 can push the engagement member 50, the spacer 33, and the sleeve 40 to the axial joint part 11 to make the first and second convex portions 12 and 51 be engaged into said another first and second concave portions 13 and 52. The number of the first and second convex portions 12 and 51 and the number of the first and second concave portions 13 and 52 are, but not limited to, four each, so the included angle between the coupling member 30 and the pedestal 10 can be adjusted for 90 degrees per one unit at a time to allow the user to flat-tune the included angle.

Figure 7:
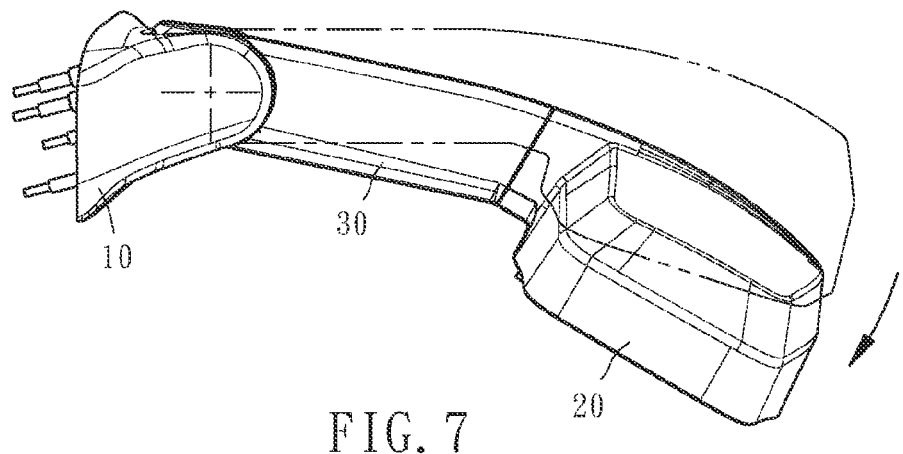
FIG. 7 is another schematic view of the preferred embodiment of the present invention at work.
Figure 8:
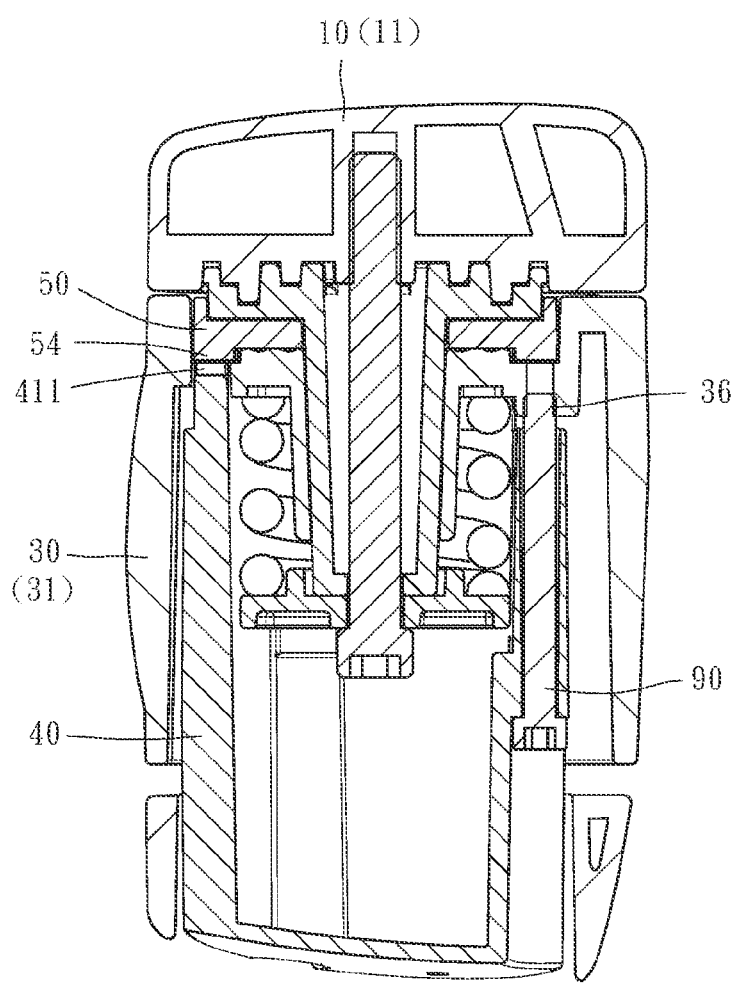
FIG. 8 is another sectional view of the preferred embodiment of the present invention at work.

Referring to FIG. 7, while it is intended to fine-tune the included angle, the user can adjust the depth for which the second screwed fasteners 90 are threaded into the threaded holes 36 via a wrench to force the sleeve 40 to move to the disengagement position shown in FIG. 8 from the engagement position shown in FIGS. 3 and 6; meanwhile, the first teeth 411 disengage from the second teeth 54, so the sleeve 40 together with the coupling member 30 and the mirror holder 20 can rotate around the axis L relatively to the pedestal 10 and the engagement member 50 at an angle subject to a pitch between every two teeth of the first and second teeth 411 and 54. For example, the included angle between every two teeth is 3 degrees in this embodiment, so the included angle between the coupling member 30 and the pedestal 10 can be adjusted for 3 degrees per one unit at a time to allow the user to fine-tune the included angle.

After the angle fine-tuning, the user can use the second screwed fasteners 90 to force the sleeve 40 toward the engagement member 50 to the engagement position and meanwhile, the first and second teeth 411 and 54 are engaged with each other again, so the included angle between the coupling member 30 and the pedestal 10 is fixed.

In conclusion, the user can directly turn the coupling member or the mirror holder to quickly collapse (flat-tune) the exterior rearview mirror assembly of the present invention and fine-tune the included angle while intending to adjust the reflective area of the rearview mirror assembly, so the user's practical needs can be satisfied.

What is claimed is:
1. An exterior rearview mirror assembly comprising:
a pedestal mounted to a vehicle and having an axial joint part, the axial joint part having a plurality of first convex portions facing downwardly, a plurality of first concave portions facing downwardly, and a plurality of an inclined guide surfaces each located between every adja- cent said first convex and concave portions, the first convex and concave portions being arranged alternately around an axis annularly;

a mirror holder having at least one mirror;

a coupling member having two ends, one of which is connected with the mirror holder and the other is a pivotal portion rotatably mounted to the pedestal around said axis, the pivotal portion having an axial hole and a spacer located inside the axial hole, the spacer having a central hole and at least one perforation;

a sleeve located below the spacer and movably mounted inside the axial hole for movement between an engagement position and a disengagement position, the sleeve having a top end, a bottom end and a plurality of first teeth, the first teeth being arranged annularly on the top end around the axis and being inserted through the perforations;

an engagement member mounted between the spacer and the axial joint part and at a top side thereof having a plurality of second convex portions, a plurality of second concave portions, and a plurality of inclined guide surfaces located between every adjacent said second convex and concave portions, the second convex and concave portions being arranged alternately around said axis annularly for engagement with the first convex and concave portions, the engagement member further having a plurality of second teeth formed at a bottom side thereof and arranged annularly around said axis;

a first screwed fastener having a head end and threaded end and passing through the central hole of the spacer and making the threaded end be threaded with the axial joint part;

a limiting member mounted to the first screwed fastener; and a springy member held between the limiting member and the pivotal portion for providing the spacer with elastic prestress facing upwardly;

wherein, when the sleeve is moved to the engagement position, the first teeth are engaged with the second teeth; when the sleeve is moved to the disengagement position, the first teeth are disengaged from the second teeth.

2. The exterior rearview mirror assembly as defined in claim 1, wherein the pedestal further comprises a protrusive ring part having a pivotal hole; the bottom end of the sleeve being rotatably mounted inside the pivotal hole and axially movable inside the pivotal hole.

3. The exterior rearview mirror assembly as defined in claim 1, wherein the sleeve comprises a plurality of convexities at the top end thereof; the first teeth are formed on top sides of the convexities respectively, the convexities being fixedly inserted into the perforations respectively.

4. The exterior rearview mirror assembly as defined in claim 1 further comprising a plurality of second screwed fasteners, wherein the pivotal portion comprises a plurality of threaded holes corresponding to the second screwed fasteners respectively; the sleeve comprises a plurality of through holes corresponding to the second screwed fasteners respectively, the second screwed fasteners passing through the corresponsive through holes and threaded into the corresponsive threaded holes respectively.

5. The exterior rearview mirror assembly as defined in claim 3 further comprising a plurality of second screwed fasteners, wherein the pivotal portion comprises a plurality of threaded holes corresponding to the second screwed fasteners respectively; the sleeve comprises a plurality of through holes corresponding to the second screwed fasteners respectively, the second screwed fasteners passing through the corresponsive through holes and threaded into the corresponsive threaded holes, respectively.

* * * * *